United States Patent
Yoshida

[11] 3,832,114
[45] Aug. 27, 1974

[54] CUTTER SHAFT DEVICE IN A PELLETIZING APPARATUS FOR SYNTHETIC RESINS

[75] Inventor: Minoru Yoshida, Hiroshima, Japan

[73] Assignee: Japan Steel Works Ltd., Tokyo, Japan

[22] Filed: Feb. 5, 1973

[21] Appl. No.: 329,834

[30] Foreign Application Priority Data
May 12, 1972  Japan.............................. 47-46437

[52] U.S. Cl............................. 425/313, 83/356.3
[51] Int. Cl............................................ B29b 1/03
[58] Field of Search .......... 83/356.3, 592, 675, 906, 83/913; 425/313; 408/137

[56] References Cited
UNITED STATES PATENTS
2,677,290  5/1954  Bonomi.............................. 408/137
3,353,213  11/1967  Niemeyer........................ 425/313 X Primary Examiner—Donald R. Schran
Attorney, Agent, or Firm—McGlew and Tuttle

[57] ABSTRACT

In a pelletizing apparatus for synthetic resins, the coarse and fine adjustments of the gap between a cutter knife and a die are effected through coarse and fine shiftings of the cutter shaft caused by the operation of separate means adapted for the coarse and fine shiftings, respectively.

7 Claims, 1 Drawing Figure

PATENTED AUG 27 1974　　　　　　　　　　　　　3,832,114
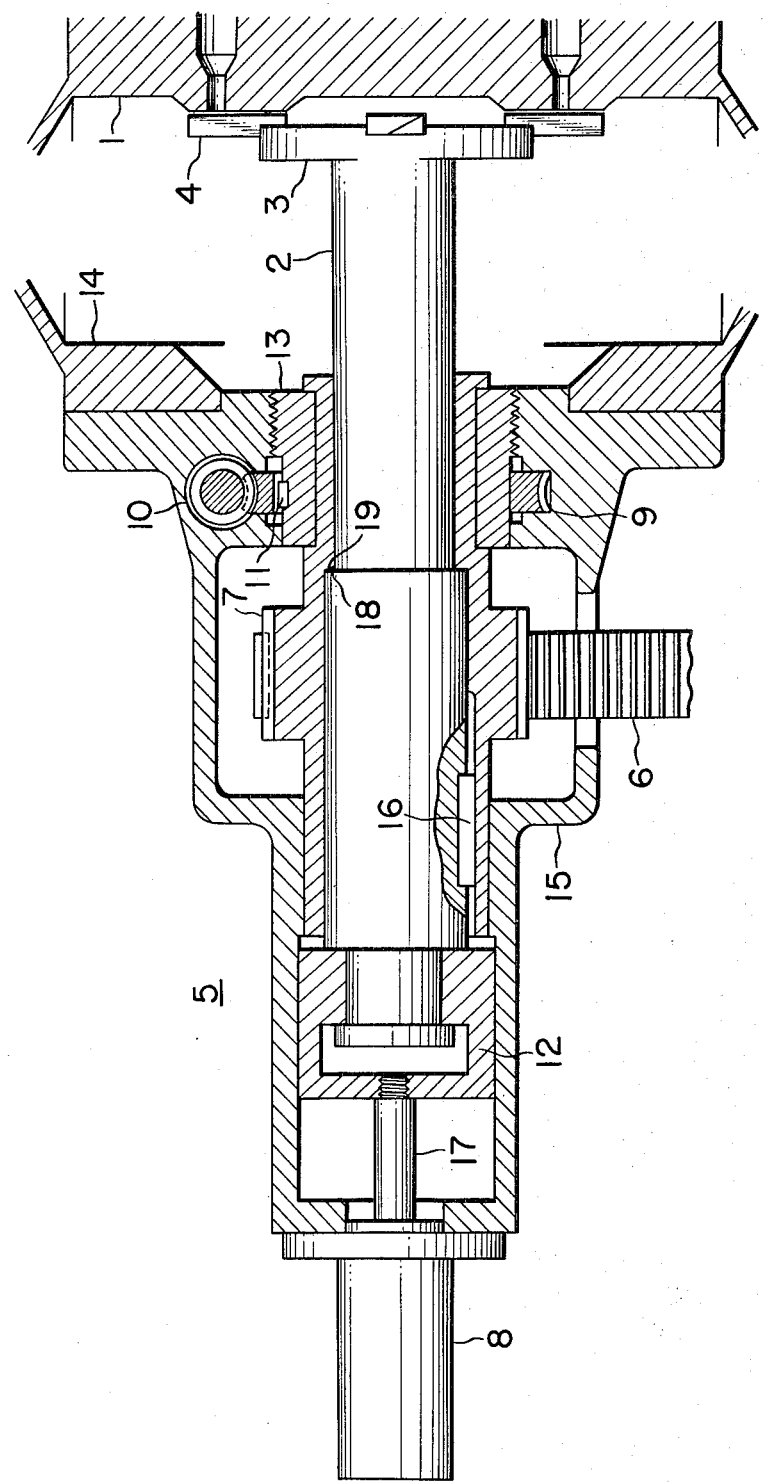

3,832,114

CUTTER SHAFT DEVICE IN A PELLETIZING APPARATUS FOR SYNTHETIC RESINS

BACKGROUND OF THE INVENTION

This invention relates to a cutter shaft device in a pelletizing apparatus for synthetic resins.

The cutter shaft in a pelletizing apparatus for synthetic resins frequently must be moved backward some distance to exchange a die and/or a cutter knife. On the other hand, the shape of pellets and the effect of pelletizing are so much affected by the gap between the die and the cutter knife, that the gap needs a minute or fine adjustment operation. For the movement of the conventional cutter shaft forward and backward, the coarse adjustment must be effected from the back and a minute or fine adjustment must be performed under observation of the gap between the cutter knife and the die, so that two operators are needed, one operating the cutter shaft from the back, the other observing the gap near the die. Moreover, as the device which moves the cutter shaft through a considerable distance is used commonly also for the fine adjustment, the fine adjustment is very difficult, demanding special skill. For the reasons mentioned above, it has been strongly desired to solve these problems in this industry.

SUMMARY OF THE INVENTION

An object of the present invention is to provide a cutter shaft device in a pelletizing apparatus for synthetic resins in which the adjustment of the gap between a cutter knife and a die of the pelletizing apparatus can be done rapidly and easily without necessiating special skill.

A cutter shaft device in a pelletizing apparatus for synthetic resins according to the present invention is characterized in that the coarse and fine adjustments of the gap between a cutter knife and a die of the pelletizing apparatus are effected through coarse and fine shiftings of a cutter shaft caused by separate means adapted for coarse and fine shiftings, respectively.

BRIEF DESCRIPTION OF THE DRAWING

This and other objects of the present invention will become more readily apparent upon a reading of the following specification and upon reference to the accompanying drawing, which shows diagrammatically an embodiment of the present invention in longitudinal section.

DESCRIPTION OF THE PREFERRED EMBODIMENT

In the drawing, numeral 1 is a die for extrusion, 2 a cutter holder shaft, 3 a cutter holder, 4 a cutter knife, 5 a cutter driving device, 6 a driving belt, 7 a driving wheel, 8 a fluid pressure cylinder such as an air cylinder, 9 a worm wheel, 10 a worm, 11 a key, 12 a cylindrical coupling, 13 an adjustment screw, 14 a housing for a pelletizing apparatus, and 15 a casing for cutter driving device 5.

As shown in the drawing, cutter driving device 5 is set at the end of pelletizing apparatus 14, air cylinder 8, for quick feeding, being mounted at the end of cutter driving device 5, and worm 10 and worm wheel 9, for fine adjustments, are mounted at the rear end or the near side to cutter holder 3.

Driving wheel 7 is supported, on one hand, in casing 15 of cutter driving device 5 and, on the other hand, in the adjustment screw 13 set in casing 15 in front of worm wheel 9, and it carries cutter holder shaft 2.

Driving wheel 7 is driven through driving belt 6 driven by a suitable drive means (not shown in the drawing) and drives cutter holder 2 with a key 16 set therein.

Driving wheel 7 is constructed to slide in casing 15 of cutter driving device 5 in the axial direction of cutter holder shaft 2, while cutter holder shaft 2 is axially slidable in driving wheel 7. Shaft 2 is moved right and left by air cylinder 8 through cylindrical coupling 12.

Worm wheel 9 is rotated by the rotation of worm 10, causing rotation of adjustment screw 13 by means of key 11.

Screw 13 moves right and left relative to casing 15, causing the movement of driving wheel 7. Worm wheel 9 always must be engaged with worm 10 in spite the axial movement, due to rotation of adjustment screw 13. For that purpose, key 11 is built as a slide key, so that worm wheel 9 can transmit its rotation to adjustment screw 13 and also they can slide relative to each other.

Cylindrical coupling 12 can move revolving cutter holder shaft 2 right and left by the movement of the piston shaft rod 17 of air cylinder 8. Key 16, set between cutter holder shaft 2 and driving wheel 7, is built as a slide key to permit both revolving and sliding movements.

In the embodiment shown, air cylinder 8 is used as a quick feeding mechanism and in order to allow a small shift of cutter holder shaft 2 to the left side, as viewed in the drawing, due to fine adjustments or other causes, through air compression, but it can be replaced by the combined mechanism of a hydraulic cylinder and a spring or the like. For fine adjustments, worm 10 and worm wheel 9 are used, but they may be replaced by other fine adjustment devices, for example, a helical gear or the like.

Now the operation of the device having the construction as above mentioned will be described fully as follows.

In order to retract cutter holder shaft 2, or to move it to the left side in the drawing, through a large distance, for exchange of the cutter knife or other reasons, air cylinder 8 can perform the operation by pulling cutter holder shaft 2 to the left side.

To set cutter knife 4 at a fixed axial position, cutter holder shaft 2 is moved coarsely to the right side in the drawing by air cylinder 8 similarly as mentioned above and, for a fine adjustment of the gap between die 1 and cutter knife 4, worm 10 is operated manually or automatically in accordance with the necessary amount of gap adjustment, whereby adjustment screw 13 is turned and fed right and left.

In this case, when adjustment screw 13 is moved to the right side, for instance, a gap occurs between the shoulder 18 of cutter holder shaft 2 and the shoulder 19 of driving wheel 7, but cutter holder shaft 2 is always pushed to the right side by air cylinder 8 as far as the gap permits, so that the gap between die 1 and cutter knife 4 is reduced by the length of the gap between shoulders 18 and 19. When worm 10 is turned in a reverse direction, worm wheel 9 is also turned in a reverse direction and the axial movement of adjustment screw 13 is also reversed. As a result, adjustment screw 13 moves to the left, so that driving wheel 7 moves to the left and shoulder 19 pushes shoulder 18 of cutter holder shaft 2 to the left side.

In this case, cutter holder shaft 2 is always biased to the right side by air cylinder 8, but it can be moved to the left side against the air pressure. Therefore the gap between die 1 and cutter knife 4 increases by the displacement of the shaft.

As mentioned above, by the device of the invention, the coarse adjustment of the cutter holder shaft right and left, without any fine adjustment, is performed by the air cylinder, with the necessary time being short, and the fine adjustment, which needs higher skill is conducted with extreme ease by the fine adjustment device comprising the worm and worm wheel.

As the adjustment can be performed by one operator near the cutter knife to be adjusted, labor saving and high accuracy of adjustment can be obtained at the same time.

The device of the invention is operated not only manually, but also automatically, easily if linked coordinated with other motion, so that the adjustment can be carried out with high accuracy and facility.

What is claimed is:

1. An adjusting device for the cutter shaft of a pelletizing apparatus for synthetic resins, rotatably mounted in a casing of the apparatus for axial displacement and carrying, at its inner end, a cutter holder carrying knives cooperable with an extrusion die of the apparatus, with a shaft driving means coupled to the shaft, said adjusting device comprising, in combination, coarse adjustment means coupled to the outer end of said shaft and operable to shift said shaft axially through a relatively large distance; fine adjustment means threaded into said casing and rotatably engaged with said shaft; interengageable abutment means limiting axial movement of said shaft in one direction relative to said fine adjustment means; said coarse adjustment means normally biasing said shaft axially inwardly to maintain said abutment means interengaged and preventing backlash of the threaded engagement of said fine adjustment means in said casing; whereby, upon rotation of said fine adjustment means, a fine axial adjustment of said shaft is effected; and operating means engaged with said fine adjustment means to rotate the same to effect fine adjustment of said shaft.

2. An adjusting device for the cutter shaft of a pelletizing apparatus for synthetic resins, as claimed in claim 1, in which said coarse adjustment means comprises a fluid pressure actuator coupled to the outer end of said shaft.

3. An adjusting device for the cutter shaft of a pelletizing apparatus for synthetic resins, as claimed in claim 1, in which said fine adjusting means comprises an adjusting member threadededly engaged in said casing; said operating means comprising a worm wheel coupled to said adjusting member for rotation thereof and axial displacement relative thereto, and a worm meshing with said worm wheel.

4. An adjusting device for the cutter shaft of a pelletizing apparatus for synthetic resins, as claimed in claim 3, in which said coarse adjustment means comprises a compressed air actuator.

5. An adjusting device for the cutter shaft of a pelletizing apparatus for synthetic resins, as claimed in claim 4, in which said shaft driving means comprises a driving wheel; means coupling said driving wheel to said shaft for conjoint rotation therewith while providing for relative axial movement of said driving wheel and said shaft; said driving wheel having an axially outwardly extending hub portion rotatably supported in said casing for relative axial displacement in said casing and rotatably supporting said shaft, and having an axially inwardly extending hub portion rotatably engaged through said adjusting member and fixed against axial displacement relatively to said adjusting member.

6. An adjusting device for the cutter shaft of a pelletizing apparatus for synthetic resins, as claimed in claim 5, in which said interengageable abutment means comprise a axially inwardly facing shoulder on said shaft engageable with an axially outwardly facing shoulder on said axially inwardly extending hub portion of said driving wheel.

7. An adjusting device for the cutter shaft of a pelletizing apparatus for synthetic resins, as claimed in claim 1, in which said shaft driving means is located within said casing; said fine adjustment means being positioned between said driving means and said inner end of said shaft.

* * * * *